United States Patent [19]

Iverson

[11] 4,104,533

[45] Aug. 1, 1978

[54] WIDEBAND OPTICAL ISOLATOR

[75] Inventor: Myren L. Iverson, Ridgecrest, Calif.

[73] Assignee: The United States of America as represented by the Secretary of the Navy, Washington, D.C.

[21] Appl. No.: 772,615

[22] Filed: Feb. 28, 1977

[51] Int. Cl.² .............................................. G02B 5/00
[52] U.S. Cl. .................................... 250/551; 250/199
[58] Field of Search ............... 250/206, 208, 551, 239, 250/199; 307/311

[56] References Cited

U.S. PATENT DOCUMENTS

| | | | |
|---|---|---|---|
| 3,385,970 | 5/1968 | Coffin et al. | 250/551 |
| 3,562,527 | 2/1971 | Chaimowicz | 250/239 |
| 3,629,590 | 12/1971 | Case | 307/311 |

OTHER PUBLICATIONS

"Optical Data Coupler", R. C. Clapper et al., IBM Tech. Disc. Bull. vol. 16, No. 11, Apr. 1974, pp. 3523-3524.

*Primary Examiner*—David C. Nelms
*Attorney, Agent, or Firm*—R. S. Sciascia; Roy Miller; Kenneth Prichard

[57] ABSTRACT

A linear voltage controlled current sink is used to power a linear LED with fast optical rise time. The signal is transmitted through a small aperture in a grounded shield plate. The receiver is a PIN photodiode with fast optical rise time.

2 Claims, 3 Drawing Figures

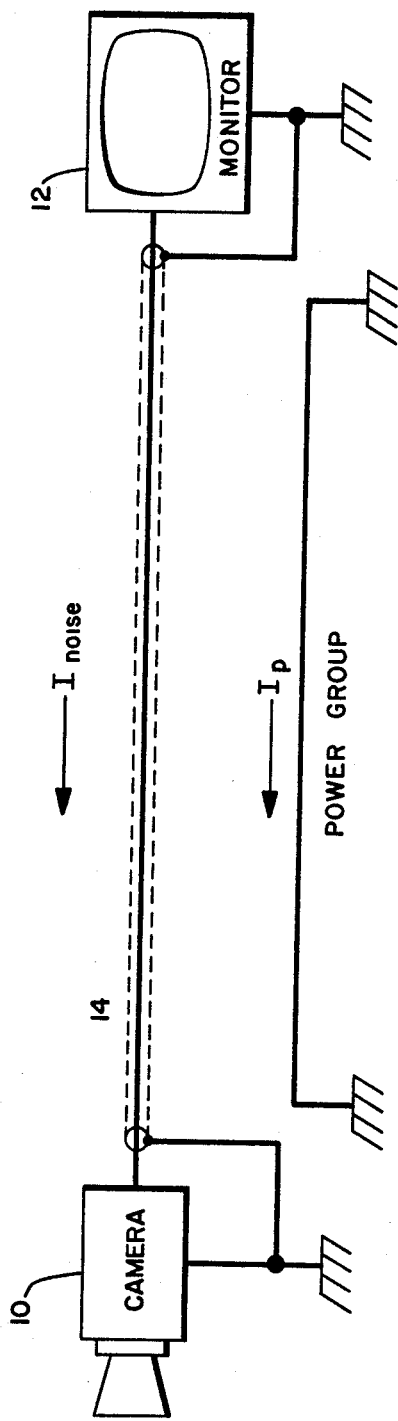
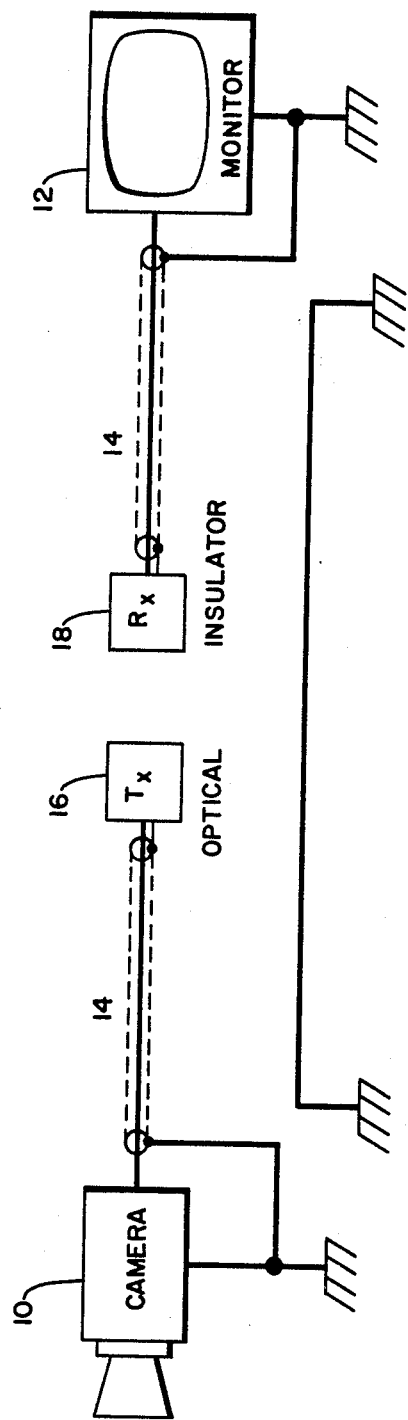
FIG. 1.
FIG. 2.

WIDEBAND OPTICAL ISOLATOR

BACKGROUND OF THE INVENTION

1. Field of the Invention

This invention relates to optical isolators and in particular optical isolators capable of wideband transmission capabilities. In even more particularity it is directed to wideband isolators with linear analog response.

2. Description of the Prior Art

Methods of eliminating ground loops are well known. One such method is electro-optical isolators that use optical wavelengths of the electromagnetic spectrum to traverse a gap in the electrical circuitry.

The slow rise time of the receivers with linear analog response has limited the bandwidth that can be transmitted. Receivers with fast optical rise time are nonlinear and therefore used as digital (on-off) systems. In such systems, the largest bandwidths are on the order of 5 MHZ. A further limitation in optical isolators is the coupling capacitance between the transmitter and receiver circuits.

SUMMARY OF THE INVENTION

Light emitting diodes, LED, with fast optical rise times exist commercially. The same is true for PIN photodiodes. By using the two as transmitter and receiver a wide band optical frequency on the order of 10 MHZ can be obtained. Use of continuous wave (CW) laser diodes, instead of LED's, provide even larger bandwidths.

As part of the transmitting circuit a voltage controlled current sink with linear response is used to modulate the incoming signal. The entire transmitting circuit is shielded.

The photodiode output is sent through a transimpedence amplifier and then a postamplifier. The entire receiving circuit is shielded to provide a low coupling capacitance, between transmitter and receiver.

An air gap separates the two circuits and in the middle of it is another shield. This shield is grounded. As a result of this shield there is very little coupling between the two circuits.

In practice this permits high resolution video transmission. The term high resolution refers to television with significantly more lines per scan than commercial television.

BRIEF DESCRIPTION OF THE DRAWINGS

FIG. 1 is a traditional cable system with ground loops.

FIG. 2 is a schematic of the present invention where an optical isolator is employed.

DESCRIPTION OF THE PREFERRED EMBODIMENT

Figure 3:
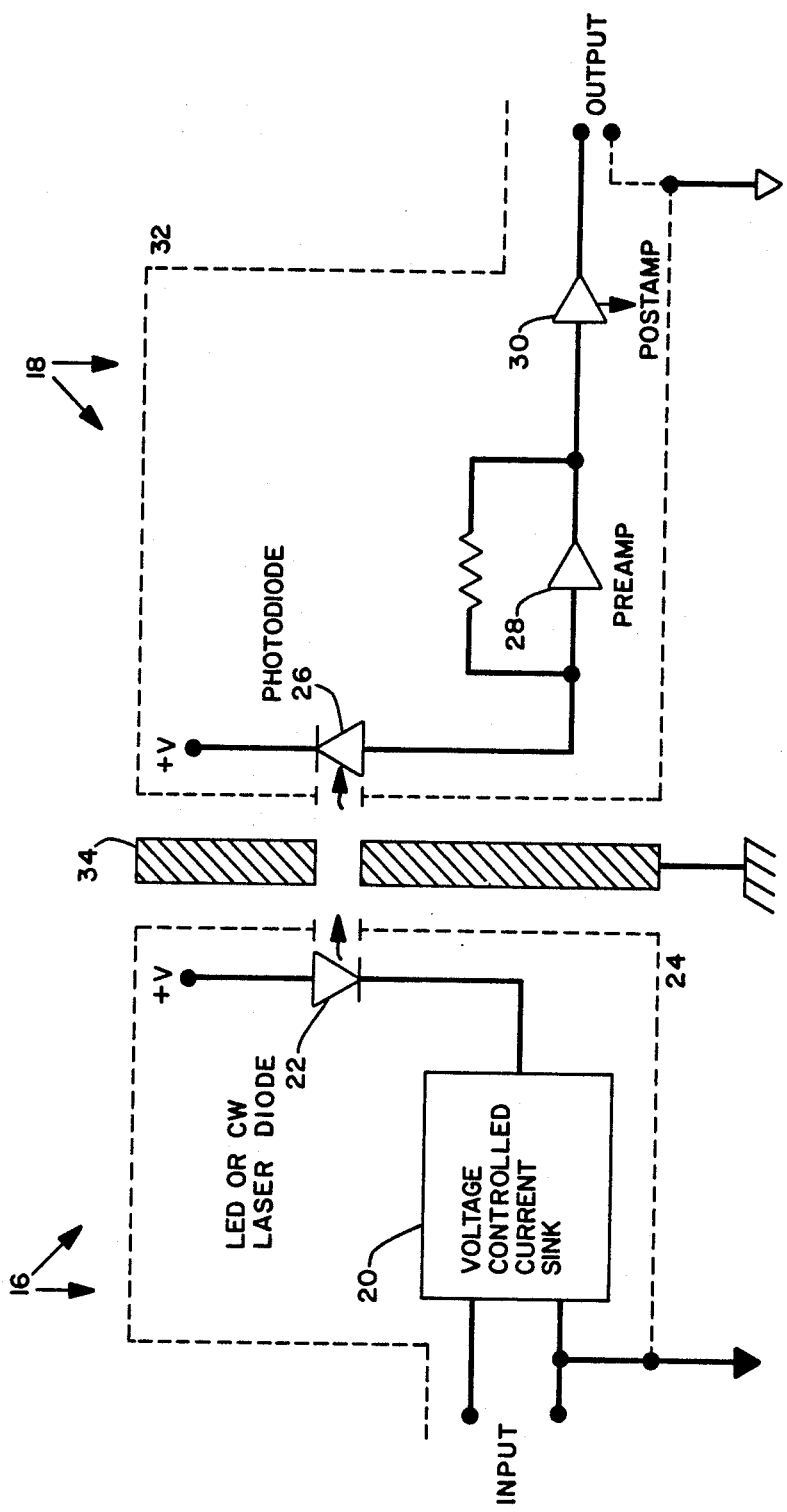
FIG. 3 is a block diagram of an embodiment of the invention.

FIG. 1 is a traditional wired circuit. Camera 10 and monitor 12 are connected by coaxial cable 14. Since the grounds can have different potentials, ground loops arise. Such loops are random and unpredictable. The randomness and unpredictability lower the signal quality. Disconnecting the ground at either the camera 10 or the monitor 12 will prevent ground loops, but a floating end can be a severe shock hazard.

FIG. 2 shows how optical isolators solve the problem of ground loops with no shock hazard. The components in the circuit are the same as FIG. 1 except there is a break in shielded wire 14. At one end an optical transmitter 16 is attached and to the other side of the break an optical receiver 18 is attached. By having both sides grounded, there is no electrical floating, which in turn avoids shock hazards. The gap between the transmitter 16 and receiver 18 prevents the electrical current which is previously discussed as ground loops.

FIG. 3 is a diagram of the present invention. The transmitter 16 and receiver 18 are shown with their circuit components. Transmitter 16 is composed of a linear voltage controlled current sink 20 for modulating the input signal. The output of sink 20 is fed to a light emitting diode, LED, 22 or CW laser diode with a fast optical rise time.

The response time or rise time in a circuit is inversely proportional to the frequency of the circuit. A "fast" rise time is one that is very short (i.e. rapid response). Thus use of fast rise time components permits large frequency bands to be transmitted. Experimental optical isolators, as disclosed above, have been built with 10 MHZ or better bandwidth. This is a rise time of 35 nanoseconds. The term "fast" refers to a rise time on the order of up to 35 nanoseconds for LED's and to 1 nanosecond for laser diodes. The rise time is the time it takes the signal to go from 10% to 90% of its peak energy level. This is the definition of rise time in *A New Dictionary of Physics* by Gray and Isaacs.

To be an analog device, the isolator must use the magnitude of the signal present as part of its information. A linear response of circuit components provides a direct way of comparing signal strengths.

The transmitter 16 includes a shield 24 which is attached to the current sink 20 input ground. Shield 24 has a hole in it so the light from LED 22 can be emitted.

The receiver 18 consists of a PIN photodiode 26 with linear response and fast optical rise time. The photodiode 26 output is attached to transimpedance amplifier 28 which serves as a preamp. Postamp 30 further amplifies the signal until it reaches a level predetermined by the desired use of the output and sensitivity of available output devices. Shield 32 protects the receiver components and is attached to output ground.

In the air gap, between transmitter 16 and receiver 18, is chassis grounded shield 34. This shield 34 reduces coupling capacitance between the transmitter and receiver. Appropriately placed in the shield 34 is a hole to permit optical light from LED 22 to pass to photodiode 26. The hole is limited in size so longer wavelengths than those of the optical range will not be transmitted.

What is claimed is:

1. A large bandwidth analog optical isolator comprising:

a linear voltage controlled current sink capable of being modulated for a large bandwidth signal;

a linear fast optical rise time light emitting diode, LED, operatively attached to the current sink for transmitting an optical signal;

a first shield around the current sink and LED tied to the sink input ground for protecting the sink and LED from stray charge;

a hole in said first shield appropriately placed for permitting the optical signals from the LED to pass through;

a PIN photodiode with a linear fast rise time for receiving the optical signal placed in the path of said optical signals;

a linear transimpedance preamplifier operatively connected to the photodiode for amplifying the signal;

a postamplifier operatively attached to the preamplifier for increasing the signal to the predetermined level needed for desired output;

a second shield around the photodiode and amplifiers tied to the sink output of the postamplifier for protecting the photodiode and amplifiers from stray charge and with a hole for permitting access of the optical signal; and a chassis grounded metal plate placed between said shields and separated therefrom by an air gap on both sides for preventing capacitive coupling between the first and second shield with a hole in said metal plate properly placed and sized for transmitting the optical signal through it from the LED to the photodiode.

2. An analog optical isolation system comprising:

a voltage controlled current sink with linear response for generating an input signal;

an electro-optical transducer operatively attached to the current sink for producing an optical analog of said input signal, where said transducer has a linear response and a fast optical rise time;

an apertured first shield positioned around said sink and transducer for protecting them from stray electrical charge, with said aperture placed so that said optical signal is transmitted through said aperture and said first shield is electrically connected to the input ground of said current sink;

an optical wavelength receiver with a linear response and a fast optical rise time for reconverting said optical signal to an electrical signal and positioned to receive said optical analog signal after it has passed through a space separating said receiver and said transducer;

at least one amplifier attached to said receiver output for increasing said reconverted electrical signal to a predetermined level, an apertured second shield positioned around said receiver and amplifier(s) for protecting them from stray electric charge, with said aperture placed so said optical signal is transmitted to said receiver and with said second shield electrically connected to an amplifier output ground such that said first and second shields are not electrically joined so as to form a single electrical shield; and a chassis grounded shield between said shielded receiver and said shielded transducer, separated by an insulation gap from each, for preventing capacitive coupling between them.

* * * * *